United States Patent [19]

Okada et al.

[11] Patent Number: 5,419,968
[45] Date of Patent: May 30, 1995

[54] SURFACE-HYDROPHILIZED FLUORORESIN MOLDINGS AND METHOD OF PRODUCING SAME

[75] Inventors: Atsushi Okada, Kusatsu; Yuichi Shimizu, Mino; Shunichi Kawanishi, Neyagawa; Masanobu Nishii, Kyoto; Shunichi Sugimoto, Hirakata, all of Japan

[73] Assignees: Gunze Limited, Ayabe; Japan Atomic Energy Research Institute, Tokyo; Radiation Application Development Association, Naka, all of Japan

[21] Appl. No.: 192,285

[22] Filed: Feb. 4, 1994

[30] Foreign Application Priority Data

Feb. 16, 1993 [JP] Japan .................................. 5-26367
Oct. 25, 1993 [JP] Japan .................................. 5-265964

[51] Int. Cl.⁶ .............................................. B05D 3/06
[52] U.S. Cl. ..................... 428/421; 427/508; 427/554; 427/558; 427/581; 427/595; 427/596
[58] Field of Search ............... 427/554, 508, 558, 595, 427/596, 581; 428/421

[56] References Cited

FOREIGN PATENT DOCUMENTS 2-196834  8/1990  Japan .
5-125208  5/1993  Japan .
5-306346 11/1993  Japan .

*Primary Examiner*—Bernard Pianalto
*Attorney, Agent, or Firm*—Armstrong, Westerman, Hattori, McLeland & Naughton

[57] ABSTRACT

The invention provides surface-modified hydrophilic fluororesin moldings. The surface of a fluororesin molding is at least partly hydrophilized by irradiating at least part of the fluororesin molding with ultraviolet laser light not longer than 400 nm in wavelength in a state such that the molding is in contact with gas-treated water prepared by introducing into water a gas such as hydrogen gas, nitrogen gas or a rare gas or with some other specific aqueous liquid. The thus-obtained fluororesin moldings are suited for use, for example, as materials of artificial blood vessels excellent in antithrombotic property, and contact lenses free of modification-due discoloration. Further, they are expected to find a wider range of application where their performance characteristics are to be utilized.

2 Claims, No Drawings

SURFACE-HYDROPHILIZED FLUORORESIN MOLDINGS AND METHOD OF PRODUCING SAME

The present invention relates to surface-hydrophilic fluororesin moldings derived from fluororesin moldings by surface hydrophilization and to a method of producing the same.

Fluororesin moldings generally have inactive surfaces and therefore are insufficient in surface hydrophilicity and adhesiveness in certain instances. The range of application of fluororesin moldings is thus limited. Therefore, for modifying the surfaces of fluororesin moldings, the methods known in the art comprise, for instance, treatment in an alkali metal solution, use of plasma, or irradiation of the surfaces of fluororesin films or the like placed in an atmosphere of $B(CH_3)_3$ gas or a mixed gas composed of $B_2H_6$ and $NH_3$, for instance, with excimer laser light to thereby cause substitution of $CH_3$ or $NH_2$ groups for F groups for surface modification (Japanese Kokai Tokkyo Koho JP 02-196834).

However, the modification methods mentioned above cause structural changes on fluororesin surfaces and can hardly attain controlled modification. In addition to these difficulties, the method comprising treatment in an alkali metal solution, for instance, has problems in that there is the risk of ignition and the treating solution is unstable and, further, that the modified portions are poor in resistance to sunlight or high-temperatures. The method using plasma is disadvantageous in that the surface modification effect is much lower as compared with fluorine-free resins such as polyethylene. The method comprising irradiation with excimer laser light in an atmosphere of $B(CH_3)_3$ or a $B_2H_6$-$NH_3$ mixture gas requires an expensive apparatus for practicing said method. Furthermore, the gas to be used in said method is special and highly toxic, and skill is required in pressure reducing and other operations.

It is an object of the present invention to provide fluororesin moldings having good surface hydrophilicity and resistant to such deteriorating factors as sunlight and heat.

Another object of the invention is to provide fluororesin moldings that can suitably be used as materials for artificial organs (e.g. artificial blood vessels), contact lenses and the like.

A further object of the invention is to provide a method by which surface-hydrophilized fluororesin moldings can be produced by an easy and simple procedure using a simple apparatus and a liquid composition that can be handled with ease, without using any complicated apparatus or any highly toxic special gas, such as $B_2H_6$ gas.

The features of the invention will become apparent from the description which follows.

In accordance with the present invention, hydrophilic fluororesin moldings the surfaces of which have been hydrophilized at least partly are provided by irradiating at least part of a fluororesin molding with ultraviolet laser light not longer than 400 nm in wavelength in a state such that said molding is in contact with (A) an aqueous solution of at least one compound selected from the group consisting of compounds containing a metal element belonging to group II of the periodic table, carboxylic acids, water-soluble macromolecular compounds, carbon monoxide and carbon dioxide, (B) gas-treated water prepared by introducing into water at least one gas selected from the group consisting of hydrogen gas, nitrogen gas and rare gases belonging to group 0 of the periodic table, or an ammonium ion-containing aqueous solution, or a mixture of said gas-treated water and said aqueous solution, or (C) a mixture of the above-mentioned (A) and (B).

The hydrophilic, or surface-hydrophilized, fluororesin moldings of the present invention are produced by irradiating at least part of a fluororesin molding with ultraviolet laser light not longer than 400 nm in wavelength in a state such that said molding is in contact with (A) an aqueous solution of at least one compound selected from the group consisting of compounds containing a metal element belonging to group II of the periodic table, carboxylic acids, water-soluble macromolecular compounds, carbon monoxide and carbon dioxide, (B) gas-treated water prepared by introducing into water at least one gas selected from the group consisting of hydrogen gas, nitrogen gas and rare gases belonging to group 0 of the periodic table, or an ammonium ion-containing aqueous solution, or a mixture of said gas-treated water and said aqueous solution, or (C) a mixture of the above-mentioned (A) and (B).

The ultraviolet laser to be used in the practice of the invention to emit ultraviolet light not longer than 400 nm in wavelength may be any one capable of emitting such ultraviolet light and typically includes, but is not particularly limited to, ArF excimer laser (wavelength 193 nm), KrF excimer laser (wavelength 248 nm), XeCl excimer laser (wavelength 308 nm), XeF excimer laser (wavelength 351 nm), $F_2$ excimer laser (wavelength 157 nm) and like excimer lasers, dye lasers, free electron lasers and so forth, while excimer lasers are preferred among them. The fluence (energy density/pulse) of the ultraviolet laser light to be used in the practice of the invention is preferably, but is not particularly limited to, about 1 to 200 $mJ/cm^2$/pulse (millijoule/square centimeter/pulse). The wavelength of such ultraviolet laser light should be not longer than 400 nm, as mentioned above, and preferably is about 120 to 380 nm. When the wavelength of the ultraviolet laser light exceeds 400 nm, the hydrophilization will become difficult to attain to a satisfactory extent.

To hydrophilize the surface of a fluororesin molding, it is estimated to be desirable, though not absolutely sure, that the C—F bonds, C—C bonds, C—O bonds and other bonds, in particular the C—F bonds, occurring on said surface as a result of the fact that said fluororesin molding surface is a fluororesin-based one should be at least partly cleaved. For that purpose, it is desirable that the ultraviolet laser light not longer than 400 nm in wavelength to be used for causing such cleavage should be absorbed within the range of the ultraviolet absorption spectrum of the fluororesin in question and that the photon energy of the ultraviolet laser light is greater than the bond energies of the above-mentioned bonds of the fluororesin. This is not particularly limitative, however. It is estimable, though yet indefinite, that even in cases where the energy of one photon in the ultraviolet laser light is lower than the bond energies, for instance, cleavage becomes possible by causing multiphoton absorption.

It is estimated, though not yet established, that when the above conditions are met and the above-mentioned bonds of a fluororesin are cleaved, those portions of the fluororesin molding to be hydrophilized that are in contact with the aqueous solution (A) mentioned above, for instance, are rendered hydrophilic as a result of substitution in those portions by H, OH, COOH, CO or other groups originating from said aqueous solution.

Similarly, it is estimated, though not yet established, that when the above conditions are met and the above-mentioned bonds of a fluororesin are cleaved, those portions of the fluororesin molding to be hydrophilized that are in contact with the particular gas-treated water (B), for instance, are modified, namely hydrophilized, as a result of substitution in those portions by H, OH, COOH, CO and other groups originating from said gas-treated water. Further, it is estimable, though not yet certain, that when the ammonium ion-containing aqueous solution (B) is used, the portions in question are hydrophilized as a result of substitution in said portions by $NH_2$, H, OH, COOH, CO and other groups originating from said aqueous solution used in accordance with the present invention.

When, for instance, an aqueous solution containing a compound of a metal element belonging to group II of the periodic table is used as the aqueous solution (A), the F atoms cleaved and liberated as mentioned above are estimably removed as a result of binding to Ca, Be or the like originating from the aqueous solution mentioned above. An estimable, but yet uncertain, reason for such binding on that occasion is that the Be—F bond energy, which is 152 kcal/mol, or the Ca—F bond energy, which is 133 kcal/mol, for instance, is greater than the C—F bond energy of 129 kcal/mol, hence Be—F, Ca—F or the like is more ready for binding than C—F and forms $CaF_2$, $BeF_2$ or the like and is thus stabilized, without liberating F again.

When the specific gas-treated water (B) is used in accordance with the invention, the F atoms cleaved and liberated as mentioned above are removed estimably, though still doubtfully, by their binding to H or the like originating from said specific gas-treated water. Furthermore, it is estimable, though uncertain as well, that the ultraviolet laser light activates both of said gas-treated water and the fluororesin molding surface, in particular the gas in said gas-treated water serves as an energy transfer agent to thereby promote activation and cause formation of polar groups on the molding surface, whereby the desired effect is produced.

When the ammonium ion-containing aqueous solution (B) is used in the practice of the invention, the F atoms cleaved and liberated as mentioned above are removed estimably by binding to H or the like originating from said aqueous solution. An estimable, but yet uncertain, reason for that binding is that the H—F bond energy, for instance, is 135 kcal/mol and is greater than the C—F bond energy, which is 129 kcal/mol, hence HF is more readily formed than C—F and is stable in that state, liberating no F any more.

The above reasonings are all based on estimations. However, future investigations will perhaps reveal the facts.

In an embodiment of the invention, the hydrophilic fluororesin moldings of the invention are produced by irradiating at least part of a fluororesin molding with ultraviolet laser light not longer than 400 nm in wavelength in a state such that said molding is in contact with the aqueous solution (A) which contains at least one compound selected from the group consisting of compounds containing a metal element belonging to group II of the periodic table, carboxylic acids, water-soluble macromolecular compounds, carbon monoxide and carbon dioxide.

The aqueous solution (A) to be used in accordance with the invention contains at least one specific compound selected from the group consisting of compounds containing a metal element belonging to group II of the periodic table, carboxylic acids, water-soluble macromolecular compounds, carbon monoxide and carbon dioxide. Said aqueous solution may contain two or more of these compounds.

The compounds containing a metal element belonging to group II of the periodic table are not limited to any particular species but widely include those known in the art, such as calcium hydroxide, beryllium hydroxide, barium hydroxide, calcium carbonate, magnesium carbonate, barium carbonate, calcium sulfate, barium sulfate and beryllium oxide.

Those known compounds that contain at least one carboxyl group can be widely used as said carboxylic acids. As examples, there may be mentioned formic acid, acetic acid and oxalic acid, among others.

Compounds containing a metal element belonging to group II of the periodic table and a carboxyl group can be classified either as compounds containing a metal element belonging to group II of the periodic table or as carboxylic acids and thus fall within the category of the particular compounds to be used in accordance with the invention. Complex salt compounds, double salt compounds and the like may of course be used as well, without any particular limitation.

The water-soluble macromolecular compounds include, among others, polyvinyl alcohol, polyethylene oxide and polyethylene glycol. In the scope of the invention, those water-soluble macromolecular compounds that contain a metal element belonging to group II of the periodic table and/or a carboxyl group are classified as water-soluble macromolecular compounds, for convenience, sake.

The concentration of one or more of these various compounds contained in the aqueous solution to be used in the practice of the invention is not limited to any particular range. Generally, however, said concentration is recommendably not less than 0.01% by weight, preferably not less than 0.1% by weight. When carbon monoxide or carbon dioxide is used, the concentration thereof in the aqueous solution is not limited to any particular range but generally it is recommendable that said concentration is not less than $10^{-5}\%$ by weight, preferably not less than 0.01% by weight. Such aqueous solution may contain an appropriate third component in a concentration such that said component in such concentration does not weaken or spoil the effect of the invention.

No particular limitations are put on the mode of preparation of the aqueous solution containing carbon monoxide and/or carbon dioxide. Thus, for instance, dry ice may be dissolved in various aqueous solutions or water, for instance, or carbon monoxide gas, carbon dioxide gas or the like gas may be brought into contact with various aqueous solutions or water, for instance. The term "water" as used herein includes, without any particular limitation, natural water, industrial water, tap water or city water, distilled water, purified water, deionized water and other appropriate grades of water. Nature-derived water species such as ordinary natural water, industrial water and tap water may contain in certain instances trace amounts of various compounds (e.g. carbon dioxide) and/or various gases. However, the amounts of such compounds and/or gases are very small, so that such water species cannot be regarded as the aqueous solutions containing the specific compounds defined herein in accordance with the present invention. For gas-water contacting, various methods per se known in the art can be employed. Thus, for instance, the gas mentioned above may be blown into water, or water may be added positively into the gas mentioned above, or a gaseous phase comprising the gas mentioned above may be provided on the water surface. No particular limitations are posed on the mode of contacting. Upon contacting in this manner, the gas mentioned above is dissolved in water or contained in water in the form of minute bubbles. When the above-mentioned gaseous phase is provided on the water surface, it is not certain whether the gas mentioned above has been dissolved in water or occurs in water in the form of bubbles. Even in such a case, the desired effect of the invention can be produced and therefore such mode of practice falls within the scope of the present invention. In the practice of the invention the gas mentioned above, namely carbon monoxide, carbon dioxide or the like, may be caused to continuously flow into the aqueous solution throughout the period of ultraviolet laser light irradiation. This mode of practice is advantageous in that the aqueous solution hardly undergoes concentration changes.

In accordance with another embodiment of the invention, the hydrophilic fluororesin moldings of the invention are produced by irradiating at least part of a fluororesin molding with ultraviolet laser light not longer than 400 nm in wavelength in a state such that said molding is in contact with (B) gas-treated water prepared by introducing into water at least one gas selected from the group consisting of hydrogen gas, nitrogen gas and rare gases belonging to group 0 of the periodic table, or an ammonium ion-containing aqueous solution, or a mixture of said gas-treated water and said aqueous solution.

As the rare gases belonging to group 0 of the periodic table, there may be mentioned helium gas, neon gas, argon gas, krypton gas and xenon gas.

In the practice of the invention, at least one of these rare gases, hydrogen gas and nitrogen gas is used. Thus, they may be used singly or two or more of them may be combinedly used.

Various methods are conceivable for preparing gas-treated water by introduction of said gas. No particular limitations are posed thereon. Generally, however, the gas mentioned above is contacted with various kinds of water to be mentioned hereinbelow. For contacting, the gas mentioned above may be blown into water, or water may be added positively into the gas mentioned above. Furthermore, a gaseous phase comprising said gas may be provided on the water surface. No particular limitations are posed on the mode of contacting. Upon contacting in this manner, said gas is dissolved in water or contained in water in the form of minute bubbles. When gas-treated water is prepared by providing the gaseous phase mentioned above on the water surface, it is not certain whether said gas has been dissolved in water or occurs in the form of bubbles. Even in such a case, the desired effect of the invention can be produced and therefore such gas-treated water falls within the scope of the present infection as well. As mentioned above, it is not always necessary that the gas mentioned above has been dissolved in water or occurs in water in the form of bubbles. The amount of said gas occurring in water is not limited to any particular range. When the gas is dissolved in water, the amount of the gas is, for example, about $10^{-2}\%$ to $10^{-5}\%$ by weight.

The ammonium ion-containing aqueous solution means an aqueous solution containing a compound capable of forming or releasing the ammonium ion ($NH_4^+$) in its dissolved state in water. As such compound, there may be mentioned ammonia, ammonium hydroxide, ammonium carbonate, ammonium sulfate, ammonium nitrate, ammonium bicarbonate, ammonium thiocyanate, ammonium chloride, ammonium persulfate and the like, which are inorganic compounds, and organic carboxylic acid salts, such as ammonium formate, ammonium oxalate, ammonium citrate and ammonium acetate, and various ammonium complex salts. Compounds capable of producing ions derived from $NH_4$ by substitution of the hydrogen atom with some other group, for example methylammonium, hydroxylammonium and the like, are also included in the class of compounds capable of forming or releasing the ammonium ion in their dissolved state in water as defined above. In the practice of the invention, at least one of such compounds is used. Thus, they may be used singly or two or more of them may be used combinedly. The level of addition of such compound is not particularly limited. Generally, it is recommendable that said compound be added to give an aqueous solution containing the same in a concentration of not more than about 10% by weight, preferably about 0.001% to 10% by weight.

The mixture of the both mentioned above may be prepared by mixing the above-mentioned ammonium ion-containing aqueous solution and the above-mentioned gas-treated water, each separately prepared in advance, or by introducing the specific gas into the ammonium ion-containing aqueous solution to thereby produce a mixture state, or by adding, conversely, the ammonium ion-producing compound mentioned above to the gas-treated water to thereby produce a mixture state, or by simultaneously producing a mixture state. No particular limitations are posed on the manner of preparing said mixture. Furthermore, both-liquids may be used for contacting with the fluororesin molding individually in two steps.

Such ammonium ion-containing aqueous solution or gas-treated water may contain one or more of various third components where appropriate. Furthermore, at least one compound selected from the group consisting of the above-mentioned group II metal element-containing compounds, carboxylic acids, water-soluble macromolecular compounds, carbon monoxide and carbon dioxide may be added to give a liquid or mixture. The addition of carbon monoxide or carbon dioxide may be carried out in the same manner as in the preparation of the gas-treated water mentioned above.

The water to be used in preparing the liquid to be used in the practice of the invention (hereinafter the term "liquid" is used to further include aqueous solution containing at least one compound selected from the group consisting of the above-mentioned group II metal element-containing compounds, carboxylic acids, water-soluble macromolecular compounds, carbon monoxide and carbon dioxide, as well as mixtures thereof or therewith) includes, but is not limited to, natural water, industrial water, tap water, distilled water, deionized water and other suitable grades of water. It is desirable that the specific gas mentioned above be introduced into such water species or the above-mentioned specific compound or ammonium ion-producing compound be mixed with or dissolved in said water. In preparing the above-mentioned gas-treated water or aqueous solution the necessary component or components may be dissolved not only in the water species mentioned above but also in an acid- or alkali-containing aqueous solution. No particular limitations are posed on the concentration of the acid- or alkali-containing aqueous solution and such acid- or alkali-containing aqueous solution is included within the category of water mentioned above. In preparing aqueous solutions containing the beryllium compounds mentioned above, which are the so-called amphoteric compounds, the use of the above-mentioned acid- or alkali-containing aqueous solution is effective in some instances. It is desirable, however, that unnecessary impurities in water should be removed as thoroughly as possible.

Nature-derived water species such as natural water, industrial water and tap water may sometimes contain trace amounts of various compounds (e.g. carbon dioxide) and/or various gases. However, the contents of such compounds and/or gases are very low and the water species mentioned above cannot be regarded as the specific compound-containing aqueous solutions, ammonium-containing aqueous solutions or specific gas-treated water as defined herein.

The specific compound-containing aqueous solutions and ammonium ion-containing aqueous solutions to be used in accordance with the invention naturally include, within the meaning thereof, aqueous suspensions, aqueous dispersions, emulsions and the like as well. In other words, they include all liquids that contain water as the main component thereof together with the specific component or components defined herein.

In accordance with the present invention, fluororesin moldings are at least partly contacted with one of the liquids mentioned above. Thus, part or the whole surface of a fluororesin molding is contacted with the liquid. No limitations are posed on the manner of contacting. For example, said molding may be immersed in the liquid or placed on the surface of the liquid, or sprayed with the liquid.

The fluororesin moldings of the invention are produced by at least partly hydrophilizing the surface thereof, namely modifying part or the whole of the surface to render the same hydrophilic. For partly hydrophilizing the surface of said moldings, the above-mentioned liquid of the invention is brought into contact partly with the molding surface and, in that state, the moldings are irradiated with the specific ultraviolet laser light defined herein. Alternatively, the liquid of the invention is contacted with the whole surface of the moldings and the molding surface is partly irradiated with said laser light. No particular limitations are posed on the manner of such surface hydrophilization. For hydrophilizing the whole molding surface of the moldings, said moldings are immersed in the liquid or placed on the surface of the liquid or sprayed with the liquid, for instance, and the whole surface of the moldings is irradiated with said laser light, although these modes of practice have no limitative meaning. The exposure time is not particularly limited but can be selected according to the kind of ultraviolet laser light, irradiation conditions and other factors. As a tentative standard, mention may be made, for instance, an exposure time such that the incident energy (exposure) amounts to about 1 to 3,000 J/cm$^2$ (joule/square centimeter).

No particular limitations are posed on the step of irradiation of fluororesin moldings with ultraviolet laser light. It is desirable, however, that said moldings be cleansed using any of various cleansing agents such as an alcohol prior to irradiation. Cleansing with such a cleansing agent can result in removal of oil or grease and other stains or the like as produced on the fluororesin molding surface in the process of molding, for instance, whereby articles of high commercial value can be obtained. Although the above-mentioned alcohol or the like is not limited to any particular species, low-boiling alcohols are preferred since they do not adversely affect the effect of modification.

The fluororesin, which serves as the raw material of the fluororesin moldings to be treated in accordance with the invention, includes, but is not limited to, tetrafluoroethylene-perfluoroalkyl vinyl ether copolymer (PFA), polytetrafluoroethylene (PTFE), tetrafluoroethylene-hexafluoropropylene copolymer (FEP), ethylene-tetrafluoroethylene copolymer (ETFE), fluorosilicone polymers synthesized from carbon fluoride and an organic silicone, and mixtures of these. Thus, all copolymers obtained by using a fluorinated monomer as one of the monomer components are included within the meaning of the term "fluororesin", irrespective of the comonomer. Such fluororesins and moldings therefrom may contain various synthetic resins, fillers and other appropriate third components provided that such third components do not cause any remarkable changes in the properties of the fluororesins.

The fluororesin moldings to be treated in accordance with the invention typically include, but are not limited to, fluororesin films, sheets, tubes, sleeves, tapes, filaments, knitted articles, woven articles, cords or strings, rods, powders and the like, inclusive of all other fluororesin moldings. The fluororesin moldings further include assemblies of fluororesin moldings with other synthetic resin moldings, composite moldings from a fluororesin and a natural, chemical or synthetic fiber or the like, and other composites in which a fluororesin or a molding thereof is used at least in part.

When a film is used as the fluororesin molding, the film has a thickness of not more than about 1 mm, for instance, when the film is to be laid on the liquid mentioned above, although there are no particular limitations on the thickness of said film. When, in the above case, the film thickness is not more than about 1 mm, the ultraviolet laser light can pass through the film (e.g. transmittance of not more than 95%, preferably 5 to 50%), advantageously resulting in modification of the back of the film, which is in contact with the liquid. In that case, when the front side of the film is kept out of contact with the liquid, the back, namely the back side surface, alone undergoes modification. This is advantageous in some instances.

The fluororesin moldings of the present invention are suited for use as materials of various artificial organs, for instance. In particular, they can give artificial blood vessels excellent in antithrombotic property. Since the modification process does not cause discoloration, said moldings can be used as materials of contact lenses, for instance. Furthermore, they can be used as partners in composite materials to be produced by adhesion or combination, for instance, with moldings made of other materials. Said fluororesin moldings are expected to find a wide range of applications in various other fields as well. No particular limitations are posed on the use thereof.

The following examples are further illustrative of the present invention but are by no means limitative of the scope of the invention. In the following examples, an excimer laser irradiation apparatus, which is a kind of ultraviolet laser, was used. Said apparatus is schematically shown in FIG. 1. In the figure, the reference numeral 1 denotes excimer laser light, 2 a mirror, 3 a mask, 4 a lens, 5 a reaction cell, 6 the liquid, 7 a fluororesin molding (film), 8 an XY stage, and 9 an excimer laser emitter. The contact angle towards water was determined on a Kyowa Kaimen Kagaku Model CA-A measurement apparatus. A drop of water was dropped onto the specimen and the contact angle was measured 30 seconds later. Each data given is the mean of three measurements.

EXAMPLE 1

A PFA resin film (100 μm thick, light transmittance 7%) [7] was brought into contact with an aqueous solution of carbon monoxide placed in a stainless steel reaction cell [5] (or a dish) (immersed in said solution [6] at a depth of 5 mm). Then, the film was irradiated, through the metal mask [3], with the light perpendicular to the film surface as emitted by an ArF excimer laser (wavelength 193 nm) [1] and collimated by the convex lens [4]. The irradiation conditions were as follows: laser fluence 13 mJ/cm$^2$/pulse, number of shots 8,000, and frequency 50 Hz. The above-mentioned aqueous solution of carbon monoxide was prepared by blowing carbon monoxide gas into distilled water at room temperature for 45 minutes.

The PFA resin film [7] treated in the above manner showed a contact angle towards water of 34°, proving to have excellent film surface hydrophilicity as compared with the unirradiated film which showed a contact angle of 106°. Analysis using an infrared spectrophotometer (FT-IR) gave peaks ascribable to —OH, C—H, C═O and C═C. XPS (X-ray photoelectron spectroscopy) analysis confirmed the occurrence of —OH, C—H and C═O on the surface. In that case, the O/C ratio (ratio between the elements C and O) showed a four-fold increase as compared with the unirradiated film while the F/C ratio (ratio between the elements C and F) decreased to one third.

EXAMPLE 2

A PFA resin film (100 μm thick) [7] was brought into contact with a 0.1% (by weight) solution of Be(OH)$_2$ in distilled water which was used in lieu of the aqueous solution [6] used in Example 1 (immersed in said solution at a depth of 5 mm). The film was then irradiated with the same ArF excimer laser light [1] as used in Example 1 collimated by the convex lens [4] and incident perpendicularly to the film surface. The irradiation conditions were as follows: laser fluence 13 mJ/cm$^2$/pulse, number of shots 16,000, and frequency 50 Hz. The aqueous solution mentioned above occurred as a suspension and Be(OH)$_2$ was not in a dissolved state because of its being insoluble in water.

The PFA resin film [7] thus treated showed a contact angle towards water of 39°, proving to have excellent film surface hydrophilicity.

EXAMPLE 3

A mixture (mixing ratio 1:1) of a 0.1% (by weight) aqueous solution of Be(OH)$_2$ and a saturated aqueous solution of carbon monoxide was used in lieu of the aqueous solution [6] used in Example 1. A PFA resin film (100 μm thick) [7] was contacted with said mixture in the same manner as in Example 1 and irradiated with the same ArF excimer laser light [1] as used in Example 1 collimated by the convex lens [4] and incident perpendicularly to the film surface. The irradiation conditions were as follows: laser fluence 13 mJ/cm$^2$/pulse, number of shots 16,000, and frequency 50 Hz. The carbon monoxide-containing mixed solution mentioned above was prepared by blowing carbon monoxide gas into distilled water containing 0.1% by weight of Be(OH)$_2$ at room temperature for 45 minutes.

The thus-treated PFA resin film [7] showed a contact angle towards water of 29°, proving to have excellent film surface hydrophilicity.

EXAMPLE 4

A PFA resin film (100 μm thick) [7] was brought into contact with a 0.1% (by weight) aqueous solution of formic acid in the same manner as in Example 1 and irradiated with the same ArF excimer laser light [1] as used in Example 1 collimated by the convex lens [4] and incident perpendicularly to the film surface. The irradiation conditions were as follows: laser fluence 13 mJ/cm$^2$/pulse, number of shots 8,000, and frequency 50 Hz.

The thus-treated PFA resin film [7] showed a significant increase in hydrophilicity as compared with the untreated film.

EXAMPLE 5

A PFA resin film (100 μm thick) [7] was brought into contact with a 0.1% (by weight) aqueous solution of polyvinyl alcohol in the same manner as in Example 1 and irradiated with the same ArF excimer laser light [1] as used in Example 1 collimated by the convex lens [4] and incident perpendicularly to the film surface. The irradiation conditions were as follows: laser fluence 13 mJ/cm$^2$/pulse, number of shots 16,000, and frequency 50 Hz.

The thus-treated PFA resin film [7] showed a contact angle towards water of 40°, proving to have excellent film surface hydrophilicity.

EXAMPLE 6

A PFA resin film (100 μm thick) [7] was brought into contact with an aqueous solution of carbon monoxide in the same manner as in Example 1 and irradiated with the same ArF excimer laser light [1] as used in Example 1 collimated by the convex lens [4] and incident perpendicularly to the film surface. The irradiation conditions were as follows: laser fluence 12 mJ/cm$^2$/pulse, number of shots 16,000, and frequency 30 Hz. The above-mentioned aqueous solution of carbon monoxide was prepared by blowing carbon monoxide gas into distilled water at room temperature for 60 minutes.

The thus-treated PFA resin film [7] showed a remarkable improvement in wettability, with a contact angle towards water of 30°, proving to have excellent film surface hydrophilicity.

EXAMPLE 7

A PFA resin film (100 μm thick) [7] was brought into contact with an aqueous solution of carbon monoxide in the same manner as in Example 1 and irradiated with the same ArF excimer laser light [1] as used in Example 1 collimated by the convex lens [4] and incident perpendicularly to the film surface. The irradiation conditions were as follows: laser fluence 30 mJ/cm$^2$/pulse, number of shots 6,400, and frequency 50 Hz. The above-mentioned aqueous solution of carbon monoxide was prepared by blowing carbon monoxide gas into distilled water at room temperature for 60 minutes.

The thus-treated PFA resin film [7] showed a remarkable improvement in wettability, with a contact angle towards water of 50°, proving to have excellent film surface hydrophilicity.

EXAMPLE 8

A PFA resin film (100 μm thick) [7] was brought into contact with an aqueous solution of carbon dioxide in the same manner as in Example 1 and irradiated with the same ArF excimer laser light [1] as used in Example 1 collimated by the convex lens [4] and incident perpendicularly to the film surface. The irradiation conditions were as follows: laser fluence 22 mJ/cm$^2$/pulse, number of shots 8,000, and frequency 50 Hz. The above-mentioned aqueous solution of carbon dioxide was prepared by blowing carbon dioxide gas into distilled water at room temperature for 60 minutes.

The thus-treated PFA resin film [7] showed a remarkable improvement in wettability, with a contact angle towards water of 37°, proving to have excellent film surface hydrophilicity.

EXAMPLE 9

The procedure of Example 8 was followed in the same manner except that a PFA resin film was placed on the surface of the aqueous solution (to thereby attain contacting with the aqueous solution: in this case, the front side surface of the film was out of direct contact with said aqueous solution). A PFA resin film having excellent hydrophilicity was obtained.

The back side surface of the thus-treated PFA resin film [7] showed excellent hydrophilicity.

COMPARATIVE EXAMPLE 1

A PFA resin film (100 μm thick) [7] was maintained in the air and irradiated with the same ArF excimer laser light [1] as used in Example 1 collimated by the convex lens [4] and incident perpendicularly to the film surface. The irradiation conditions were as follows: laser fluence 22 mJ/cm$^2$/pulse, number of shots 8,000, and frequency 50 Hz.

The PFA resin film [7] thus treated became corrugated and had an impaired appearance. There was no difference in contact angle towards water between said film and the untreated film. No improvement in hydrophilicity was thus attained.

EXAMPLE 10

Gas-treated water prepared by blowing nitrogen gas into distilled water for 10 minutes was placed in the stainless steel reaction cell [5] (or a dish). A PFA resin film (100 μm thick, light transmittance 7%) [7] was brought into contact with said aqueous solution [6] (immersed in said aqueous solution at a depth of 5 mm) and then irradiated, through the metal mask [3], with the ArF excimer laser light (wavelength 193 nm) [1] collimated by the convex lens [4] and incident perpendicularly to the film surface. The irradiation conditions were as follows: laser fluence 13 mJ/cm$^2$/pulse, number of shots 16,000, and frequency 50 Hz.

The PFA resin film [7] treated in the above manner showed a contact angle towards water of 70°, proving to have excellent film surface hydrophilicity as compared with the untreated film which showed a contact angle of 106°.

EXAMPLE 11

Gas-treated water prepared by blowing hydrogen gas into distilled water for 10 minutes was used in lieu of the gas-treated water [6] used in Example 10. A PFA resin film (100 μm thick) [7] was brought into contact with the aqueous solution (immersed in said aqueous solution at a depth of 5 mm) and irradiated with the same ArF excimer laser light [1] as used in Example 10 collimated by the convex lens [4] and incident perpendicularly to the film surface. The irradiation conditions were as follows: laser fluence 13 mJ/cm$^2$/pulse, number of shots 16,000, and frequency 50 Hz.

The thus-treated PFA resin film [7] showed a contact angle towards water of 30°, proving to have excellent film surface hydrophilicity.

EXAMPLE 12

Gas-treated water was prepared by blowing helium gas into distilled water for 10 minutes and used in lieu of the gas-treated water [6] used in Example 10. A PFA resin film (100 μm thick) [7] was brought into contact with said gas-treated water and irradiated with the same ArF excimer laser light [1] as used in Example 1 collimated by the convex lens [4] and incident perpendicularly to the film surface. The irradiation conditions were as follows: laser fluence 13 mJ/cm$^2$/pulse, number of shots 16,000, and frequency 50 Hz.

The thus-treated PFA resin film [7] showed a contact angle towards water of 40°, proving to have excellent film surface hydrophilicity.

EXAMPLE 13

A PFA resin film (100 μm thick) [7] was brought into contact, in the same manner as in Example 10, with gas-treated water prepared by blowing argon gas into distilled water for 10 minutes, and irradiated with the same ArF excimer laser light [1] as used in Example 1 collimated by the convex lens [4] and incident perpendicularly to the film surface. The irradiation conditions were as follows: laser fluence 13 mJ/cm$^2$/pulse, number of shots 16,000, and frequency 50 Hz.

The thus-treated PFA resin film [7] showed much increased hydrophilicity, with a contact angle of 34°, as compared with the untreated one.

EXAMPLE 14

A PFA resin film (100 μm thick) [7] was brought into contact, in the same manner as in Example 10, with gas-treated water prepared by blowing xenon gas into distilled water for 10 minutes, and irradiated with the same ArF excimer laser light [1] as used in Example 1 collimated by the convex lens [4] and incident perpendicularly to the film surface. The irradiation conditions were as follows: laser fluence 13 mJ/cm$^2$/pulse, number of shots 16,000, and frequency 50 Hz.

The thus-treated PFA resin film [7] showed a contact angle towards water of 53°, proving to have excellent film surface hydrophilicity.

EXAMPLE 15

An aqueous ammonium solution having a concentration of 0.01% (by weight) was placed in a stainless steel reaction cell [5] (or a dish). A PFA resin film (100 μm thick; light transmittance 7%) [7] was brought into contact with said aqueous solution (placed on the surface of said aqueous solution, the front side surface of the film being out of contact with said aqueous solution)

and then irradiated, through the metal mask [3], with the ArF excimer laser light (wavelength 193 nm) [1] collimated by the lens [4] and incident perpendicularly to the film surface. The irradiation conditions were as follows: laser fluence 13 mJ/cm$^2$/pulse, number of shots 16,000, and frequency 50 Hz.

The back side surface of the thus-treated PFA resin film [7] showed a contact angle towards water of 31°, proving to have excellent film surface hydrophilicity.

EXAMPLE 16

A 0.1% (by weight) aqueous solution of ammonia was used in lieu of the aqueous solution [6] used in Example 15. A PFA resin film (100 μm thick) [7] was brought into contact with said aqueous solution (placed on said aqueous solution, the state of contact being the same as in Example 15) and irradiated with the same ArF excimer laser light [1] as used in Example 15 collimated by the convex lens [4] and incident perpendicularly to the film surface. The irradiation conditions were as follows: laser fluence 13 mJ/cm$^2$/pulse, number of shots 16,000, and frequency 50 Hz.

The back side surface of the thus-treated PFA resin film [7] showed a contact angle towards water of 32°, proving to have excellent film surface hydrophilicity.

EXAMPLE 17

A 0.01% (by weight) aqueous solution of ammonium carbonate was used in lieu of the aqueous solution [6] used in Example 15. A PFA resin film (100 μm thick) [7] was brought into contact with said aqueous solution in the same manner as in Example 15 and irradiated with the same ArF excimer laser light as used in Example 15 collimated by the convex lens [4] and incident perpendicularly to the film surface. The irradiation conditions were as follows: laser fluence 13 mJ/cm$^2$/pulse, number of shots 16,000, and frequency 50 Hz.

The back side surface of the thus-treated PFA resin film [7] showed a contact angle towards water of 57°, proving to have excellent film surface hydrophilicity.

COMPARATIVE EXAMPLE 2

A PFA resin film (100 μm thick) [7] was placed in a nitrogen gas atmosphere or a helium gas atmosphere and irradiated with the same ArF excimer laser light [1] as used in Example 1 collimated by the convex lens [4] and incident perpendicularly to the film surface. The irradiation conditions were as follows: laser fluence 13 mJ/cm$^2$/pulse, number of shots 16,000, and frequency 50 Hz.

The PFA resin film [7] treated in either atmosphere became corrugated as compared with the untreated film and thus presented an impaired appearance. There was no difference in contact angle towards water between the treated film and the untreated film, the contact angle of the former being 110° and that of the latter being 107°. No improvement was attained in hydrophilicity.

In accordance with the present invention, fluororesin moldings with excellent surface hydrophilicity can be produced by a simple and easy procedure using a simple apparatus and a liquid easy to handle without using any complicated apparatus or any highly toxic gas such as $B_2H_6$ or $NH_3$ gas. The hydrophilicity provided in accordance with the invention is very excellent and will not be deteriorated upon exposure to sunlight or heat. The hydrophilic fluororesin moldings of the invention are suited for use, for example, as artificial blood vessels excellent in antithrombotic property and as various other artificial organs and also suited for use as materials of contact lenses because of no modification-due discoloration. They are further suited for use as materials for producing composite materials with other moldings. Furthermore, owing to their excellent performance characteristics, they can be expected to be useful in every conceivable field of application.

What is claimed is:

1. A hydrophilic fluororesin molding the surface of which has been at least partly hydrophilized as produced by irradiating at least part of a fluororesin molding with ultraviolet laser light not longer than 400 nm in wavelength in a state such that said molding is in contact with (A) an aqueous solution of at least one compound selected from the group consisting of compounds containing a metal element belonging to group II of the periodic table, carboxylic acids, water-soluble macromolecular compounds, carbon monoxide and carbon dioxide, (B) gas-treated water prepared by introducing into water at least one gas selected from the group consisting of hydrogen gas, nitrogen gas and rare gases belonging to group 0 of the periodic table, or an ammonium ion-containing aqueous solution, or a mixture of said gas-treated water and said aqueous solution, or (C) a mixture of the above-mentioned (A) and (B).

2. A hydrophilic fluororesin molding as claimed in claim 1, wherein the ultraviolet laser light not longer than 400 nm in wavelength is the light emitted by an excimer laser.

* * * * *